United States Patent [19]  
Sterzel

[11] Patent Number: 4,734,234  
[45] Date of Patent: Mar. 29, 1988

[54] PREPARATION OF VERY STRONG AND VERY HEAT-STABLE CERAMIC MOLDINGS OF SILICON NITRIDE

[75] Inventor: Hans-Josef Sterzel, Dannstadt-Schauernheim, Fed. Rep. of Germany

[73] Assignee: BASF Aktiengesellschaft, Ludwigshafen, Fed. Rep. of Germany

[21] Appl. No.: 821,325

[22] Filed: Jan. 21, 1986

[30] Foreign Application Priority Data

Feb. 7, 1985 [DE] Fed. Rep. of Germany ....... 3504145

[51] Int. Cl.$^4$ ............................................. C04B 35/58
[52] U.S. Cl. ........................................ 264/66; 264/65; 264/332; 501/97
[58] Field of Search ........................... 264/65, 66, 332; 501/97

[56] References Cited

U.S. PATENT DOCUMENTS

| | | | |
|---|---|---|---|
| 3,835,211 | 9/1974 | Coe | 264/66 |
| 4,025,351 | 5/1977 | Masaki | 106/59 |
| 4,073,845 | 2/1978 | Buljan et al. | 264/65 |
| 4,097,293 | 6/1978 | Komeya et al. | 106/43 |
| 4,264,547 | 4/1981 | Pous | 264/65 |
| 4,264,550 | 4/1981 | Ezis | 264/332 |
| 4,376,652 | 3/1983 | Buljan | 501/97 |

FOREIGN PATENT DOCUMENTS 0070440 1/1983 European Pat. Off. .
2412637 6/1976 Fed. Rep. of Germany .

*Primary Examiner*—James Derrington  
*Attorney, Agent, or Firm*—Keil & Weinkauf

[57] ABSTRACT

Pore-free, compact moldings of silicon nitride are produced by a method in which amorphous silicon nitride powder is compressed in a first stage at from 1200° to 1350° C. and from 50 to 600 kp/cm$^2$ to give a glassy molding, and the silicon nitride is converted in a second stage to crystalline silicon nitride at from 1400° to 1800° C. without the use of pressure.

4 Claims, No Drawings

PREPARATION OF VERY STRONG AND VERY HEAT-STABLE CERAMIC MOLDINGS OF SILICON NITRIDE

Compounds formed between the elements boron, carbon, nitrogen, silicon, titanium, zirconium, molybdenum and tungsten form the basis for non-oxide ceramic materials. These materials are silicon carbide, silicon nitride, boron carbide, boron nitride, the boron silicides and the nitrides and carbides of titanium, zirconium, molybdenum and tungsten.

Because of their stability to oxidation and their extremely high strength at high temperatures, silicon nitride and silicon carbide are particularly noteworthy among these materials. In particular, silicon nitride exhibits extremely high strength at very high temperatures of about 1400° C. To prepare silicon nitride, silica is reduced with carbon, but only as far as silicon metal. This then serves directly as a starting material for the preparation of silicon nitride by reaction with nitrogen.

Silicon nitride as such is known, but has been hitherto used only in minor amounts.

Silicon nitride can be prepared by the reaction sintering method, in which products of various densities are obtained, as well as by hot pressing and by sintering under atmospheric pressure (Motortechnische Zeitschrift 42 (1981) 1, pages 23-28).

To prepare the reaction-sintered silicon nitride, powdered silicon having a very small particle size is converted to structural components, with or without a temporary binder, by any shaping method known in the ceramics industry. After treatment for a short time at from 1100° to 1300° C. in nitrogen or argon, this molding is sufficiently compact to permit it to be machined to any desired shape. Final firing is then carried out in a nitrogen atmosphere at from 1300° to 1500° C., the silicon being converted to silicon nitride. During this process, the porosity decreases while at the same time the material becomes compacted. There is virtually no change in volume during this procedure, so that it is possible to produce structural components with very great dimensional accuracy (tolerances of about $\pm 0.1\%$), without subsequent processing being required. In spite of the fact that it still has a porosity of not less than 20%, the material exhibits considerable strength since the pore radii are predominantly less than 0.2 $\mu$m. The production of fairly thick-walled and large structural components presents problems since on the one hand the nitrogen has to penetrate from outside (the increase in weight is 60%), and on the other hand the reaction is exothermic, so that the oven may overheat and the silicon may melt before it has reacted.

Sintering of pure silicon nitride by the standard method generally used for the conventional oxide-ceramic materials is not possible. However, intensive development work over the past few years has resulted in a material which is referred to as silicon nitride sintered under atmospheric pressure. It contains 10% or more of added foreign oxides, such as oxides of scandium, of yttrium and of the lanthanides (U.S. Pat. Nos. 4,025,351, 4,097,293, 4,073,845 and 4,376,652). These additives make it possible, with suitable measures during sintering, to produce a substantially dense silicon nitride product without excessive loss of material as a result of decomposition. In these sintering methods, the powdered starting mixture, which contains silicon nitride and the oxidic sintering assistants, with or without the addition of a temporary binder, is compressed to give the desired molding, which is then fired at from 1500° to 1900° C. During firing, the moldings exhibit pronounced shrinkage, i.e. more than 15%, so that the production of dimensionally accurate workpieces without subsequent machining is possible only to a restricted extent. Furthermore, the stated oxidic sintering assistants lead to the formation of intercrystalline or partially amorphous phases at the boundary between the individual particles, resulting in particular in a decrease in the strength at high temperatures.

In the production of moldings by this method, the silicon nitride powder is first brought into the desired shape, and this molding is sintered as described above. Several methods are available for shaping: Individual pieces are usually manufactured by the isostatic pressing method. This method gives crude blanks from which the desired shape is then obtained by machining. For moderate numbers of articles, the ceramic slip casting method is used. In this method, the starting powder is mixed with a liquid to give a slip, and this is poured into a porous mold, filling the latter. Removal of the liquid present in the mold gives the ceramic blank. The ceramic casting mold is relatively cheap to produce.

For large series, the automatic dry pressing method or the injection molding process is used. Both require expensive molds but operate with very short cycle times. For complicated shapes, as in the case of gas turbine components, injection molding is used. In this process, a thermoplastic is added to the mass, and the mixture is heated in a suitable machine and pressed into the mold, where it cools and hardens. The process requires a further step, i.e. elimination of the plastic by heating, before the actual sintering is then carried out. This process substantially complicates the method, especially in the case of products which must not contain any carbon.

A material of even higher quality is obtained by the hot pressing method, in which pressure and heat are applied simultaneously. At high temperatures of from 1600° to 1800° C. and under pressures of from 150 to 500 kp/cm$^2$, substantial compaction of silicon nitride powder can be achieved, although only with the addition of certain amounts of oxides, such as $SiO_2$, $Al_2O_3$, BeO or $Li_2O$ (cf. German Laid-Open Application DOS No. 2,412,637). This process gives silicon nitride moldings which to date have been found to possess the greatest mechanical strengths. The disadvantage of the process, which in any case is expensive, is that it is possible to produce only relatively simple articles, which have to be machined to their final dimensions using diamond tools.

An important problem in the production of ceramic moldings from silicon nitride is the difficulty in achieving uniformity within an article and from article to article. In these materials, which cannot be subjected to plastic deformation, inhomogeneity immediately results in stresses, which have an adverse effect on the strength.

Owing to inhomogeneity and microcracks having dimensions of from 0.1 to 10 $\mu$m, it has not been possible to date to produce silicon nitride moldings which have a high load-bearing capacity and whose strengths, particularly at high temperatures, are constant within limits permitted in construction. This is all the more important with regard to use in practice, since there is still no reliable non-destructive test method which permits the unsuitable moldings to be singled out.

It is an object of the present invention to overcome the stated disadvantages of the conventional processes for the economical production of moldings of silicon nitride, and to provide a process which permits the production of such moldings while dispensing with the simultaneous use of high pressures and temperatures of 1500° C. or above, and avoiding the use of sintering assistants, which reduce strength, rigidity and heat stability.

We have found that these objects are achieved, according to the invention, by a process for the production of moldings of silicon nitride by sintering amorphous silicon nitride powder under atmospheric pressure and at elevated temperatures, if, in a first stage, amorphous silicon nitride powder is compressed at from 1200° to 1350° C. and under from 50 to 600 kp/cm² to give a compact glassy molding, and, in a second stage, the silicon nitride is converted to crystalline silicon nitride at from 1400° to 1800° C. without the use of pressure.

The novel process is carried out using finely divided, amorphous silicon nitride which suitably has a particle size of from 0.001 to 10 μm and may also contain up to 5% by weight of crystalline silicon nitride ($\alpha$ or $\beta$ form). Amorphous silicon nitride is obtained, for example, by reacting a silicon halide, such as $SiCl_4$, $SiHCl_3$, $SiH_2Cl_2$, $SiH_3Cl$ or a corresponding bromide or iodide, with ammonia at from 400° to 1600° C. in the course of about 30–0.1 seconds (cf. for example European Pat. No. 70,440):

Amorphous $Si_3N_4$ can also be obtained in a gasphase reaction in which $SiH_4$ and $NH_3$ are reacted and a $CO_2$ laser is used as the heat source. This process gives round amorphous particles having diameters of about 0.002–0.2 μm (cf. for example Haggerty, John S. and Cannon, W. Roger in Laser-Induced Chem. Processes, 1981, 165–241; Ed. Steinfeld, Jeffrey I.; Plenum, N.Y.).

In a first step, amorphous silicon nitride is compressed at from 1200° to 1350° C. and under from 50 to 600, preferably from 100 to 300, kp/cm² to give a glassy molding. An important advantage of the novel process is that the silicon nitride is in a state capable of flow in this temperature range. Consequently, the pressure on the molding material is transmitted uniformly, even to remote parts of the mold. This effect, which is not present during sintering of ceramic materials, makes it possible to use the novel process for the economical production of large numbers of moldings having a complicated shape by means of a plunger-type injection molding machine in production cycles which are limited only by the flow of the molding material.

In a second subsequent process step, the amorphous, glassy molding is converted to the actual ceramic molding by crystallization. This step is carried out at from 1400° to 1800° C. Although this treatment is carried out without pressure, the shape should nevertheless be maintained during the procedure in order to avoid distortion of the molding and therefore a loss of dimensional stability. However, only small retaining forces are required for this purpose. It is also necessary to maintain the shape because, during the heating phase and until a minimum crystallinity of from 5 to 20% is reached, the low viscosity may cause the molding to flow, resulting in a loss of dimensional stability.

The crystallization temperature is advantageously chosen so that the desired crystalline modification ($\alpha$- or $\beta$-$Si_3N_4$) is formed. In principle, it may be stated that $\alpha$-$Si_3N_4$ is predominantly formed at up to about 1500° C., while the formation of $\beta$-$Si_3N_4$ is favored at above 1600° C. If the desired crystalline modification is $\beta$-$Si_3N_4$, the glassy molding is brought very rapidly to the desired upper temperature in order to prevent the formation of the undesirable $\alpha$-modification. Temperatures above 1800° C. should not be exceeded, because the silicon nitride begins to dissociate.

The duration of the treatment in the second stage depends on the desired crystalline modification and the temperature used, and is in general about 1–100 minutes. To increase the rate of crystallization, it is advantageous to add a nucleating agent to the amorphous $Si_3N_4$ being processed, unless it is in any case partially crystalline. Appropriate finely divided particles having the desired crystal structure of molding are preferably chosen as the nucleating agent. The particle sizes of the nucleating agents are from 0.001 to 1 μm and they are used in concentrations of from 0.0001 to 1% by weight, so that from $10^9$ to $10^{15}$ seeds per cm³ result.

The novel process is based on the fact that, in the temperature range of from 1200° to 1350° C. which is employed in the first stage, amorphous silicon nitride is in a viscoelastic state in which it can be molded with the application of pressure. Owing to the high viscosity, however, crystallization does not yet take place in this temperature range, but instead takes place at a marked rate only at the higher temperatures in the second stage. According to the invention, this state is utilized to produce compact and pore-free moldings in the first stage without the use of oxidic sintering assistants otherwise usually employed, and it is only in the second stage that the amorphous $Si_3N_4$ is converted to crystalline $Si_3N_4$ at higher temperatures.

In addition to the possibility of producing absolutely pore-free and microcrack-free moldings from nonoxidic ceramics, the process according to the invention has another important advantage: when crystallization of the molding is carried out with a local temperature gradient, it is possible to achieve oriented crystallization which permits the orientation of certain crystallographic axes in a desired, preferred direction. For example, when it is known that the compressive strength or tensile strength is particularly high in the direction of certain crystal faces, it is possible to position precisely these faces in the molding so that they lie in the direction of maximum mechanical stress.

Since thermal expansion is generally anisotropic, i.e. the expansions in the directions of the crystallographic axes differ, it is advantageous to use the method of oriented crystallization to orient the crystallographic axes in the molding so that the thermal expansion in the molding is steered in the desired directions.

Moldings produced according to the invention can be used as structural elements having a high load-bearing capacity, in piston engines, gas turbines, heat exchangers or exhaust gas turbochargers or, for example, as cutting tools in machining.

EXAMPLE

An amorphous silicon nitride obtained from silicon tetrachloride and ammonia in a gas-phase reaction, having the composition $Si_3N_4$ and a mean particle size of 1.2 μm and containing, as the nucleating agent, 0.1% by weight of $\beta$-$Si_3N_4$ having a particle size of about 1.1 μm was pressed to give a glassy, pore-free molding measuring 3.5×4.5×60 mm, at 1300° C. and under 250 kg/cm². The molding was transferred to a mold preheated at 1700° C. and crystallized there in the course of 6 minutes. This gave a pore-free molding which was shown by X-ray measurements to consist of virtually 100% of $\beta$-Si$_3$N$_4$. Using a four-point measuring method, the flexural strengths were measured at a test velocity of 0.5 mm/min and at various temperatures. To do this, the 4.5×60 mm face of the test specimen is positioned centrally on two blades which are a distance of 40 mm apart. A ram which carries the two counter-blades at 20 mm apart is moved from above onto the middle of this arrangement at the stated test velocity.

| Temperature (°C.) | Measurement | Measured value (kg/cm$^2$) |
|---|---|---|
| 20 | Flexural strength | 8500 |
| 1000 | Flexural strength | 8000 |
| 1400 | Flexural strength | 5500 |
| 20 | Modulus of elasticity | 330,000 |

I claim:

1. A process for the production of compact, pore-free moldings of silicon nitride by sintering amorphous silicon nitride powder which comprises: compressing amorphous silicon nitride powder in the absence of sintering assistants in a first stage at from 1200° to 1350° C. and from 50 to 600 kp/cm$^2$ to give a compact glassy molding; and converting the compact glassy molding in a second stage to crystalline silicon nitride at a temperature of from 1400° to 1800° C. without the use of pressure.

2. The process of claim 1, wherein the amorphous silicon nitride powder has a particle size of from 0.001 to 10 $\mu$m.

3. A process as claimed in claim 1, wherein the amorphous silicon nitride powder contains from 0.0001 to 1% weight of $\alpha$- and/or $\beta$-silicon nitride as a nucleating agent.

4. The process of claim 1, wherein the amorphous silicon nitride powder is heated in the first stage at a pressure of 100 to 300 kp/cm$^2$.

* * * * *